US007605956B2

(12) United States Patent
Lee

(10) Patent No.: US 7,605,956 B2
(45) Date of Patent: Oct. 20, 2009

(54) MULTI-FUNCTION MACHINE HAVING JAM REMOVING APPARATUS AND JAM REMOVING METHOD THEREOF

(75) Inventor: Yong-hyun Lee, Suwon-si (KR)

(73) Assignee: Samsung Electronics Co., Ltd., Suwon-Si (KR)

( * ) Notice: Subject to any disclaimer, the term of this patent is extended or adjusted under 35 U.S.C. 154(b) by 1025 days.

(21) Appl. No.: 10/845,083

(22) Filed: May 14, 2004

(65) Prior Publication Data

US 2005/0018234 A1 Jan. 27, 2005

(30) Foreign Application Priority Data

Jul. 21, 2003 (KR) ..................... 10-2003-0049910

(51) Int. Cl.
*H04N 1/04* (2006.01)

(52) U.S. Cl. ........................ 358/498; 358/496; 358/1.1; 358/474

(58) Field of Classification Search ................. 358/498, 358/1.1, 496, 300, 505, 473, 474; 399/124; 347/3, 4, 108; 271/189, 273, 162, 9.01, 278, 271/279; 400/625, 629, 691, 642, 693, 605
See application file for complete search history.

(56) References Cited

U.S. PATENT DOCUMENTS

| | | | | |
|---|---|---|---|---|
| 4,895,288 | A | 1/1990 | Kotani et al. | |
| 5,038,228 | A | 8/1991 | Takada | |
| 5,095,370 | A | 3/1992 | Takada et al. | |
| 5,294,106 | A * | 3/1994 | Takagi et al. | 271/162 |
| 5,376,987 | A * | 12/1994 | Onuki | 355/45 |
| 5,412,490 | A * | 5/1995 | Kojima et al. | 358/498 |
| 5,567,068 | A * | 10/1996 | Egashira et al. | 400/625 |
| 5,839,032 | A * | 11/1998 | Yasui et al. | 399/124 |
| 5,896,206 | A | 4/1999 | Kellogg | |
| 6,384,940 | B1 | 5/2002 | Kawai et al. | |
| 6,795,203 | B1 * | 9/2004 | Akahane et al. | 358/1.1 |
| 7,210,680 | B2 * | 5/2007 | Yoneda et al. | 271/273 |

(Continued)

FOREIGN PATENT DOCUMENTS

| | | |
|---|---|---|
| JP | 2001-083754 | 3/2001 |

*Primary Examiner*—Houshang Safaipour
(74) *Attorney, Agent, or Firm*—Roylance, Abrams, Berdo & Goodman, LLP

(57) ABSTRACT

A multi-function machine has a jam removing apparatus comprising a first case disposed with respect to a printer unit to form a portion of paper supply path of the printer unit and having a portion of component parts of a scanner unit therein, a second case disposed with respect to the first case to form a portion of document supply path of the scanner unit together with the first case and having the rest of the component parts of the scanner unit therein, a first moving unit to separate the first and second cases apart from the printer unit so as to remove a jammed sheet of paper when the sheet of paper is jammed in the printer unit, and a second moving unit to separate the second case apart from the first case so as to remove a jammed document when the document is jammed in the scanner unit. The multi-function machine can remove the jammed sheet of paper and/or document jammed in scanning and/or printing operations, en bloc in the same place by one jam removing apparatus, and can also be constructed to have a reduced size and compact structure.

15 Claims, 6 Drawing Sheets

U.S. PATENT DOCUMENTS 7,284,752 B2 * 10/2007 Nagata et al. ............... 271/189
7,349,127 B2 * 3/2008 Kadomatsu ................. 358/496
2003/0156298 A1 * 8/2003 Matsuyama et al. .......... 358/1.1
2007/0196157 A1 * 8/2007 Matsushima et al. ........ 400/691

* cited by examiner

MULTI-FUNCTION MACHINE HAVING JAM REMOVING APPARATUS AND JAM REMOVING METHOD THEREOF

CROSS-REFERENCE TO RELATED APPLICATIONS

This application claims priority under 35 U.S.C. §119(a) of Korean Patent Application No. 2003-49910, filed on Jul. 21, 2003, in the Korean Intellectual Property Office, the entire contents of which are incorporated herein by reference.

BACKGROUND OF THE INVENTION

1. Field of the Invention

The present invention relates to a multi-function machine having both scanning and printing functions, such as a facsimile machine. More particularly, the present invention relates to a multi-function machine having a paper-jam removing apparatus and a paper-jam removing method thereof, which are capable of removing a jammed sheet of paper or document en bloc in the same place when the sheet of paper and/or the document are jammed in either or both of the scanning and/or printing operations.

2. Description of the Related Art

In order to improve office efficiency and realize office automation, recently introduced multi-function machines perform various functions. For example, these machine perform copying, printing and faxing functions in a single body, and are widely used in many offices.

Such a multi-function machine is usually provided with a scanner unit having a scanner to scan a document, and a printer unit having a print head, or a developing device as in an image forming apparatus. Generally, the scanner unit and the printer unit are constructed such that they are operated separately from each other to perform scanning and printing operations, respectively.

Referring to FIG. 1, a general inkjet multi-function machine 1 is illustrated that has both scanning and printing functions.

The inkjet multi-function machine 1 comprises a printer unit 10 to print data onto a sheet of paper P, and a scanner unit 50 to read data out of a document D.

The printer unit 10 is provided with a paper supply cassette or frame 28 to stack sheets of paper P, a paper pickup roller 32 to pick up one sheet of paper P at a time from the paper supply frame 28, a paper feed and paper feed backup rollers 34 to align a leading end of the paper P picked up by the paper pickup roller 32 and to feed the sheet of paper P, and a carriage 92 having an ink cartridge 14 mounted thereon to reciprocate in right and left directions along a carriage shaft 16. The printer unit 10 further comprises a paper discharge and a paper discharge backup rollers 37 to discharge the sheet of paper P printed by a print head onto a paper stacker 94. The ink cartridge 14 has the print head to jet ink onto the sheet of paper P fed by the paper feed and the paper feed backup rollers 34.

The scanner unit 50 is provided with a top frame 70 comprising a document supply tray for loading documents D and disposed to be slidable thereby to allow for exchange of the ink cartridge 14, a document sensor 71 to detect whether the documents D are loaded, and a document pickup roller 76 to pick up the documents D according to the operation of the document sensor 71. The scanner unit 50 is further provided with a document friction pad 74 for coming into contact with the document pickup roller 76 at a predetermined pressure to separate and feed one document D at a time by the friction force therebetween, document feed and document feed backup rollers 78 and 80 to align a leading end of the document D and to feed the document D, and a white roller 82 to support the document D opposite to a contact image sensor 84 and to feed the document D. The scanner unit 50 is further provided with a contact image sensor 84 to read data out of the document D delivered by the white roller 82, a document discharge roller 86 to discharge the document D past through the contact image sensor 84 onto a document stacker 90, and a cover 72 disposed to be openable and closable in a counterclockwise direction on a hinge axis 88 for maintaining and repairing of the scanner unit 50.

In such a conventional multi-function machine 1, however, since the printer unit 10 and the scanner unit 50 are constructed to be independently driven from each other, there are problems in that if a sheet of paper P and/or a document D are jammed in the scanning and/or printing units, the jammed paper and/or document needs to be removed by separate methods.

If the sheet of paper P is jammed in the printing operation, the top frame 70 is upwardly slid and moved and then the jammed paper P is removed by putting a hand in the printer unit 10 to pick it out of the non-visible paper feeding path therein. If, however, the document D is jammed in the scanning operation, the cover 72 is opened in the counterclockwise direction and then the jammed document D is removed by picking it out of the document feeding path in the scanner unit 50.

Further, in the conventional multi-function machine 1, there is a problem in that the height of the multi-function machine 1 increases and its size is enlarged, since the structure of the scanner unit 50 is placed on the printer unit 10, and the printer unit 10 has a top-down type paper supply path in which sheets of paper are supplied from the top to the bottom.

SUMMARY OF THE INVENTION

An object of the present invention is to substantially solve at least the above problems and/or disadvantages and to provide at least the advantages described below. Accordingly, it is an object of the present invention to provide a multi-function machine having a paper-jam removing apparatus and a paper-jam removing method thereof that can remove a jammed sheet of paper or document en bloc in the same place by one jam removing apparatus, when the sheet of paper and/or the document is jammed in the scanning and/or printing device.

It is another aspect of the present invention to provide a multi-function machine having a jam removing apparatus and a jam removing method thereof, in which a paper supply cassette of a printer unit for printing a sheet of paper is disposed below a printing means such as a print head in a main body frame, and a scanner unit for scanning a document is positioned at the rear of the printer unit, thereby reducing the size and complexity of the structure.

To achieve the above aspects and other features of the present invention, a multi-function machine is provided comprising a printer unit to print data onto a sheet of paper, a scanner unit to read data out of a document, and a jam removing apparatus. The jam removing apparatus according to an embodiment of the present invention comprises a first case disposed with respect to the printer unit to form a portion of a paper supply path of the printer unit and having a portion of component parts of the scanner unit therein, a second case disposed with respect to the first case to form a portion of a document supply path of the scanner unit together with the first case and having the rest of the component parts of the scanner unit therein, and a first moving unit to separate the first and second cases apart from the printer unit so as to remove a jammed sheet of paper when the sheet of paper is jammed in the printer unit.

The first case in accordance with an embodiment of the present invention can be provided with a paper guide surface guiding the sheet of paper from a paper pickup roller to a paper feed roller to form a portion of the paper supply path, and a first document guide surface guiding the document conveyed by the scanner unit. The second case can be provided with a second document guide surface guiding the document from a document pickup roller to a document discharge roller to form the portion of the document supply path in cooperation with the first document guide surface.

In accordance with an embodiment of the present invention the first moving unit can be comprised of a case moving guide installed at a main body frame, and a case slider installed at the first case to slide along the case moving guide. The case moving guide can be formed of at least one projecting portion installed at the main body frame, and the case slider may be formed of a sliding plate having at least one sliding slot formed corresponding to the projecting portion to slidably receive the projecting portion.

In accordance with an embodiment of the present invention the projecting portion is formed of one of a I-shaped projection and a small roller.

The first moving unit according to an embodiment of the present invention further comprises a case slider locking part to lock the case slider after the case slider is completely inserted into the main body frame along the case moving guide.

The case slider locking part according to an embodiment of the present invention is comprised of a protuberance formed at the projecting portion, and a protuberance-receiving groove formed at the sliding slot.

The multi-function machine according to an embodiment of the present invention further comprises a second moving unit to separate the second case apart from the first case so as to remove a jammed document when the document is jammed in the scanner unit.

The second moving unit according to an embodiment of the present invention is be comprised of a locking and releasing part to lock or release the first and the second cases in or from each other, and a hinge part to rotatably support the second case on one of the first case and the case slider of the first moving unit.

The locking and releasing part according to an embodiment of the present invention comprises at least one projected member formed at one of the first and the second cases, at least one receiving member formed at a position corresponding to the projected member at the other of the first and the second cases so as to receive and lock the projected member, and at least one releasing member to release a locking between the projected member and the receiving member.

The projected member according to an embodiment of the present invention is comprised of a hook supported elastically and rotatably at the one of the first and the second cases, and the receiving member is comprised of a hook-receiving opening having a hook-hanging jaw formed corresponding to the hook at the other of the first and second cases.

The releasing member according to an embodiment of the present invention is comprised of a button to push the hook to be released from the hook-hanging jaw of the hook-receiving opening, and a restoring part to restore the button in an original position when the button is released from the hook-hanging jaw.

The button according to an embodiment of the present invention is be formed of a rod having one end to come in contact with the hook through a first hole formed at an inner reinforcing wall of the first case, the other end protruded outside through a second hole formed at an outer surface of the first case, and an intermediate portion with a ring-shaped lip to secure the button to restrain from being pulled out through the second hole. The restoring part according to an embodiment of the present invention is formed of an elastic spring disposed between the ring-shaped lip and the inner reinforcing wall to elastically press the other end of the rod to protrude outside the first case.

The hinge part according to an embodiment of the present invention is comprised of a hinge axis to rotatably fix the second case on one of the first case and the case slider of the first moving unit installed at the first case, and a stopper formed at the case slider of the first moving unit to restrict a range in which the second case is separated apart from the first case.

According to another embodiment of the present invention, a multi-function machine is provided comprising a printer unit to print data onto a sheet of paper, a scanner unit to read data out of a document, and a jam removing apparatus. The jam removing apparatus comprises a first case disposed with respect to the printer unit to form a portion of paper supply path of the printer unit and having a portion of component parts of the scanner unit therein, a second case disposed with respect to the first case to form a portion of document supply path of the scanner unit together with the first case and having the rest of the component parts of the scanner unit therein, and a second moving unit to separate the second case apart from the first case so as to remove a jammed document when the document is jammed in the scanner unit.

According to yet another embodiment of the present invention, a jam removing method of a multi-function machine having a printer unit to print data onto a sheet of paper, and a scanner unit to read data out of a document, comprises separating a first case apart from the printer unit, the first case being disposed with respect to the printer unit to form a portion of paper supply path of the printer unit, and removing a jammed sheet of paper from the portion of the paper supply path.

The step of separating the first case apart from the printer unit comprises sliding a case slider installed at the first case along a case moving guide installed at a main body frame.

The jam removing method according to still another embodiment of the present invention can further comprise separating a second case from the first case, the second case being disposed with respect to the first case to form a portion of document supply path of the scanner unit together with the first case, and removing a jammed document from the portion of the document supply path.

The step of separating the second case from the first case comprises releasing a locking between the first case and the second case, and rotating the second case about one of the first case and the case slider installed at the first case, within a predetermined range.

BRIEF DESCRIPTION OF THE DRAWINGS

The above aspects and other advantages of the present invention will become more apparent by describing in detail a preferred embodiment thereof with reference to the attached drawings, in which.

DETAILED DESCRIPTION OF THE PREFERRED EMBODIMENTS

Figure 1:
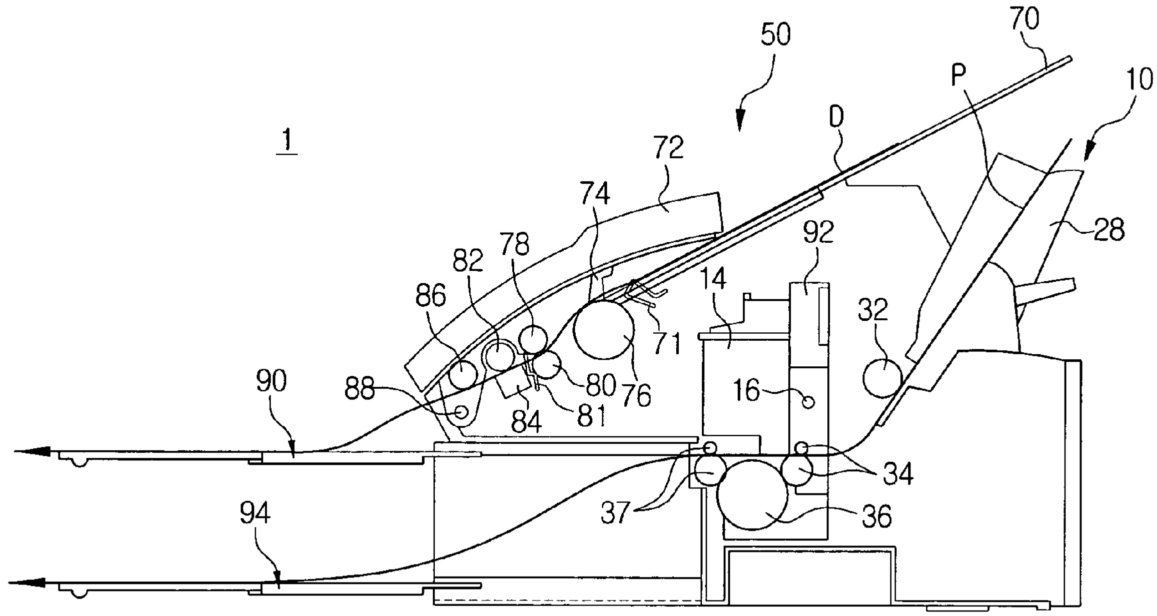
FIG. 1 (PRIOR ART)
FIG. 1 is a cross sectional view of a conventional general multi-function machine.

Hereinafter, a multi-function machine having a jam removing apparatus according to an embodiment of the present invention will be described in detail with reference to the accompanying drawings. In the drawings, the same or similar elements are denoted by the same reference numerals even though they are depicted in different drawings. In the following description, a detailed description of known functions and configurations incorporated herein have been omitted for conciseness.

Figure 2:
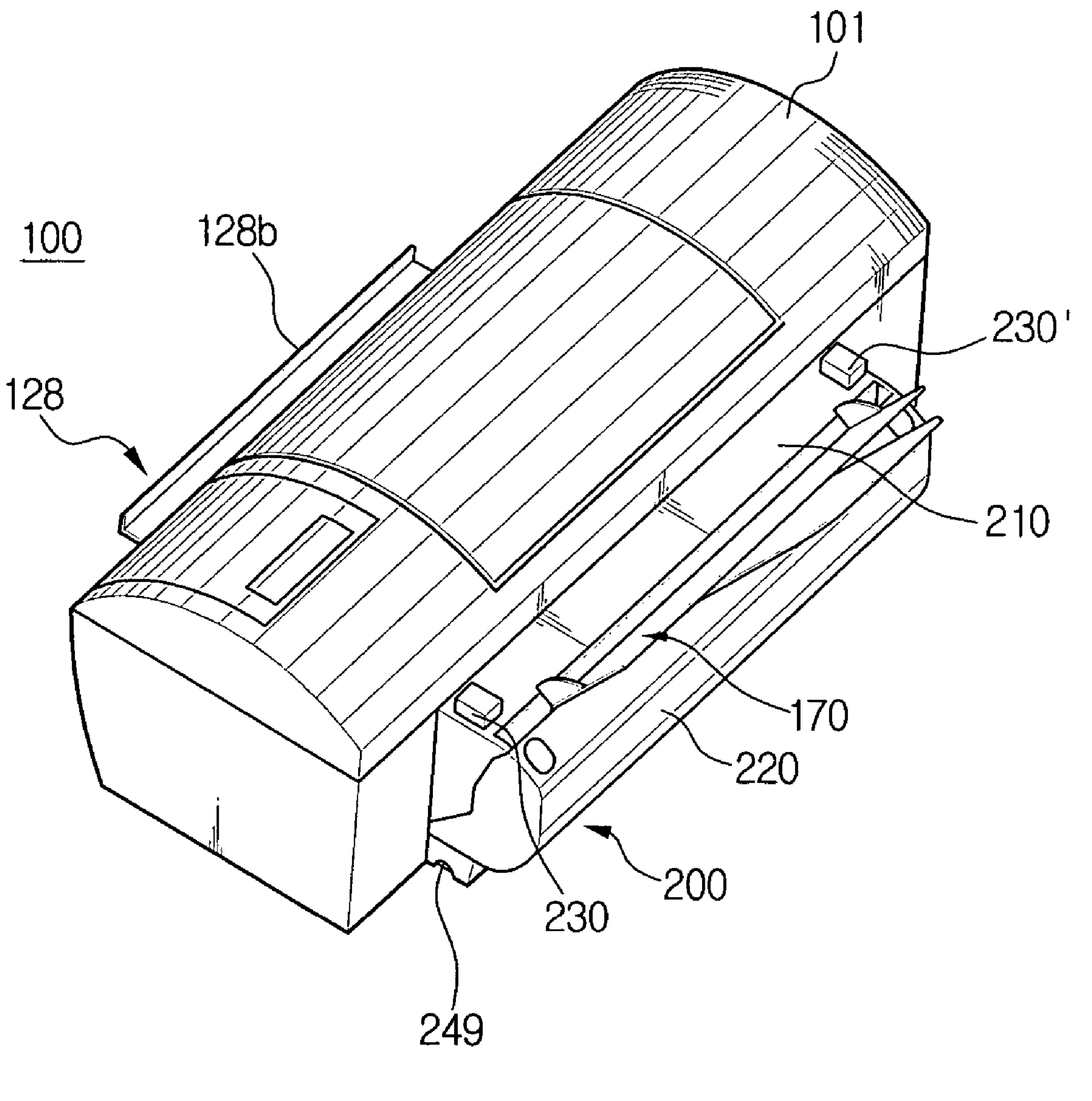
FIG. 2 is a perspective view of a multi-function machine having a jam removing apparatus according to an embodiment of the present invention.
Figure 3:
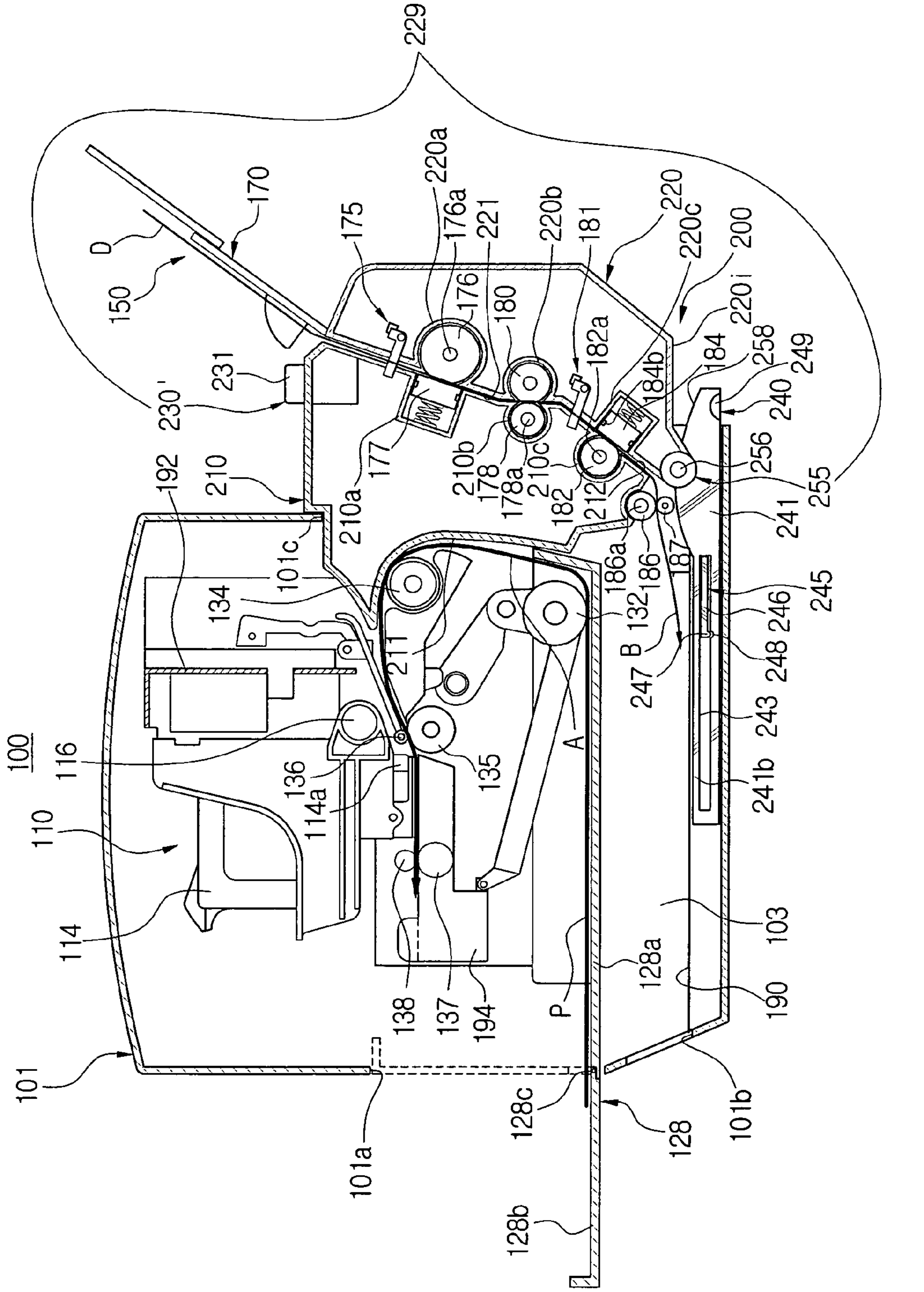
FIG. 3 is a cross sectional view of the multi-function machine shown in FIG. 2.

Referring to FIGS. 2 and 3, a multi-function machine 100 having a jam removing apparatus 200 is illustrated according to an embodiment of the present invention. The multi-function machine 100 comprises a printer unit 110 to print data onto a sheet of paper P, disposed in a main body frame 101, a scanner unit 150 to read data out of a document D, disposed outside the main body frame 101 at the rear of the printer unit 110, and a jam removing apparatus 200 having the scanner unit 150 therein to be disposed outside the main body frame 101 at the rear of the printer unit 110. The jam removing apparatus 200 is capable of moving either a portion of or the entire scanner unit 150 therein to remove a jammed sheet of paper P or document D when the sheet of paper P or document D is jammed in the printer unit 110 and the scanner unit 150 during a printing or a scanning operation.

The printer unit 110 is provided with a paper supply cassette 128, a paper pickup roller 132, a paper feed roller 134, register and register backup rollers 135 and 136, and an ink cartridge 114 having a print head 114*a*. The printer unit 110 is further provided with paper discharge and paper discharge backup rollers 137 and 138, and a paper stacker 194.

A description of certain component parts of the printer unit 110 will be omitted here for purposes of conciseness, as they are identical to those of the conventional ones described above with reference to FIG. 1. In order to provide a reduced size and a compact structure, however, the paper supply cassette 128 having a fixed portion 128*a* and a rotating portion 128*b* rotatably supported on a hinge axis 128*c* formed at one end of the fixed portion 128*a* is disposed below the ink cartridge 114 with the print head 114*a*, so as to be inserted into and ejected from the main body frame 101 through a first opening 101*a* formed at the front of the main body frame 101.

To drive the paper pickup roller 132, the paper feed roller 134, the register roller 135 and the paper discharge roller 137, a printer driving motor (not shown) is installed in the main body frame 101, as well as a plurality of gear trains (not shown) to drive the respective rollers 132, 134, 135 and 137. A printer power switching unit (not shown) is also provided to transmit the driving force of the printer driving motor to the corresponding gear train 132, 134, 135 or 137 according to the revolving direction of the printer driving motor. The description of these component parts will be also omitted here, for purposes of conciseness, as they are well known in the art.

The scanner unit 150 is provided with a document supply rest 170, a document sensor 175, a document pickup roller 176, a document friction pad 177, document feed and document feed backup rollers 178 and 180, white roller 182, and contact image sensor 184.

These component parts of the scanner unit 150 have a generally known construction, except that the document supply rest 170, the document sensor 175, the document pickup roller 176, the document feed backup rollers 180, and the contact image sensor 184 are disposed in a second case 220 of the jam removing apparatus 200, which will be described in greater detail below. The document friction pad 177, the document feed roller 178 and the white roller 182 are disposed in a first case 210 of the jam removing apparatus 200, also described in greater detail below.

Installed at the rear of a lower part of the main body frame 101 are document discharge and document discharge backup rollers 186 and 187 to discharge the document D past through the contact image sensor 184 onto a document stacker 190 in the main body frame 101.

Formed at the front of the lower part of the main body frame 101 is a second opening 101*b* to pick out the document D discharged onto the document stacker 190 by the document discharge roller 186 therethrough.

A scanner driving motor (not shown) is installed at one side of the rear of the lower part of the main body frame 101 to drive the document pickup roller 176, the document feed roller 178, the white roller 182, and the document discharge roller 186. The scanner driving motor is connected with a scanner power switching unit (not shown) that is generally known in the art.

The scanner power switching unit transmits a driving force of the scanner driving motor to the document pickup roller 176 and the document feed roller 178, or the white roller 182 and the document discharge roller 186 through corresponding gear trains (not shown) according to the revolving direction of the scanner driving motor.

When the scanner driving motor revolves in one direction, for example, a clockwise direction, the scanner power switching unit transmits the driving force of the scanner driving motor to a document pickup roller gear (not shown) and a document feed roller gear (not shown). The document pickup roller gear and document feed roller gear are formed respectively on one end of each of a document pickup roller shaft 176*a* and a document feed roller shaft 178*a* through a document pickup gear train (not shown) and a document feed gear train (not shown) to drive the document pickup roller 176 and the document feed roller 178. When the scanner driving motor revolves in the other direction, for example a counterclockwise direction, the scanner power switching unit transmits the driving force of the scanner driving motor to a white roller gear (not shown) and a document discharge roller gear (not shown). The white roller gear and the document discharge roller gear are formed respectively on each of the ends of a white roller shaft 182*a* and a document discharge roller shaft 186*a* through a white roller gear train (not shown) and a document discharge gear train (not shown) to drive the white roller 182 and the document discharge roller 186.

The document pickup gear train is installed at one side of the inside of the first case 210, such that an output tip or extremity thereof is engaged with or disengaged from the document pickup roller gear. The document pickup roller gear is formed on the one end of the document pickup roller shaft 176*a* positioned in the second case 220 of the jam removing apparatus 200 and an input tip thereof is engaged with or disengaged from the scanner power switching unit. The scanner power switching unit installed at the one side of the inside of the main body frame 101.

Accordingly, when removing a document jam, the first case 210 and the second case 220 are coupled with or separated from each other by a locking and releasing part 230, 230' (described later in reference to FIGS. 3 and 6B), and the document pickup gear train is engaged with or disengaged from the document pickup roller gear formed on the one end of the document pickup roller shaft 176*a*, Whereas when removing a jammed sheet of paper, the first and second cases 210 and 220 are coupled with or separated apart from the printer unit 110 by a first moving unit 240 (described in greater detail in reference to FIGS. 3 and 6A), and the document pickup gear train is engaged with or disengaged from the scanner power switching unit.

The document feed gear train and the white roller gear train are installed at one side of the inside of the first case 210, such that respective output tips thereof are respectively engaged with or disengaged from the document feed roller gear. The white roller gear formed on one end of the document feed roller shaft 178*a* and the white roller shaft 182*a* positioned in the first case 210 and respective input tips thereof are respectively engaged with or disengaged from the scanner power switching unit installed at the one side of the lower part of the inside of the main body frame 101.

Accordingly, when removing a jammed sheet of paper, the first and second cases 210 and 220 are coupled with or separated apart from the printer unit 110 by the first moving unit 240, and the document feed gear train and the white roller gear train are engaged with or disengaged from the scanner power switching unit.

The document discharge gear train is installed at the one side of the rear of the lower part of the main body frame 101, such that an output tip thereof is engaged with the document discharge roller gear formed on the one end of the document discharge roller shaft 186*a* and an input tip thereof is engaged with the scanner power switching unit.

Figure 4:
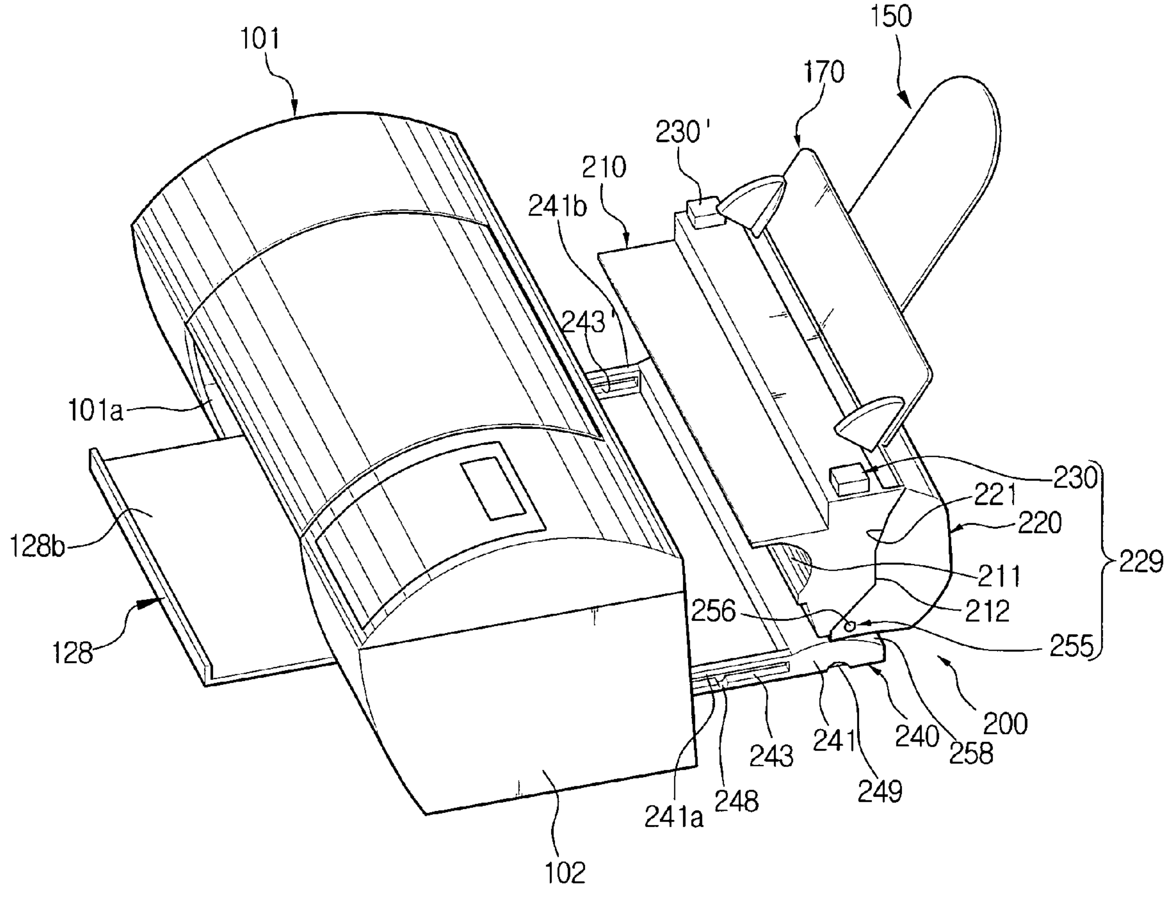
FIG. 4 is a perspective view of the multi-function machine shown in FIG. 2, in which the jam removing apparatus is ejected.

As shown in detail in FIGS. 3 and 4, the jam removing apparatus 200 comprises a first case 210 having a paper guide surface 211 to guide the sheet of paper P conveyed by the printer unit 110 onto a paper supply path A thereof, so as to form a portion of the paper supply path A at the rear of the printer unit 110, and a first document guide surface 212 to guide the document D conveyed by the scanner unit 150 onto a document supply path B of the scanner unit 150. The jam removing apparatus 200 further comprises a second case 220 having a second document guide surface 221 to form a portion of the document supply path B in cooperation with the first document guide surface 212 at the rear of the first case 210, and a first moving unit 240 to separate the first and second cases 210 and 220 apart from the printer unit 110 so as to expose the portion of the paper supply path A of the printer unit 110 to the outside, thereby to removing the jammed sheet of paper P when the sheet of paper P is jammed in the printer unit 110. The jam removing apparatus 200 further comprises a second moving unit 229 to separate the second case 220 apart from the first case 210 so as to expose the portion of the document supply path B of the scanner unit 150, thereby removing the jammed document D when the document D is jammed in the scanner unit 150.

The first case 210 is provided with a friction pad recess 210*a*, a document feed roller recess 210*b*, and a white roller recess 210*c* to receive a portion of component parts of the scanner unit 150 (i.e., the document friction pad 177, the document feed roller 178, and the white roller 182) therein, respectively.

Installed at one side of the first case 210 opposite to the side of the rear of the lower part of the main body frame 101 on which the scanner power switching unit is disposed is a gear train recess (not shown) to receive the document pickup gear train, the document feed gear train, and the white roller gear train. The white roller gear train drives the document pickup roller 176, the document feed roller 178, and the white roller 182, respectively.

The paper guide surface 211 of the first case 210 is formed of a curved surface which guides the sheet of paper P from the paper pickup roller 132 to the paper feed roller 134 to form the portion of the paper supply path A of the printer unit 110.

The second case 220 is provided with a document pickup roller recess 220*a*, a document feed backup roller recess 220*b*, and a contact image sensor recess 220*c* to receive the rest of component parts of the scanner unit 150 (i.e., the document pickup roller 176, the document feed backup roller 180, and the contact image sensor 184) therein, respectively.

The first and the second guide surfaces 212 and 221 of the first and the second cases 210 and 220 are preferably formed of S-shaped surfaces curved opposite to each other, which guide the document D from the document supply rest 170 to the document discharge roller 186 to form the portion of the document supply path B of the scanner unit 150.

The first moving unit 240 is provided with a case moving guide 245 installed at the main body frame 101 below the printer unit 110, and a case slider 241 fixed at a lower part of the first case 210 thereunder, to slide along the case moving guide 245 together with the first case 210.

In an embodiment of the present invention, the case moving guide 245 is formed of two projecting portions, for example, two I-shaped projections 246 (one shown) formed at inner surfaces of both sidewalls 102 and 103 of the main body frame 101 to project and extend lengthwise in a direction of supplying the document D. The case slider 241 is formed of a drawer-shaped sliding plate having sidewalls 241*a* and 241*b* with two sliding slots 243 and 243' (FIG. 4) formed lengthwise in the direction of supplying the document D and corresponding to the projecting portions 246 to slidably receive the projecting portions 246.

Alternatively, instead of the two I-shaped projections 246, the case moving guide 245 can be formed of two small rollers formed at the inner surfaces of the both sidewalls 102 and 103 of the main body frame 101 to slide along the sliding slots 243 and 243'.

In an embodiment of the present invention, the sliding slots 243 and 243' are formed to have a lengthwise length larger by about 90 mm more than that of the projecting portions 246, so that the case slider 241 fixed at the first case 210 can be ejected by about 90 mm outside the main body frame 101.

To lock the case slider 241 after it is completely inserted into the main body frame 101 along the case moving guide 245 through a third opening 10*c*, the first moving unit 240 further comprises a case slider locking part 247, 248.

The case slider locking part 247, 248 is comprises two protuberances 247 (one shown), each of which is projected from the front of an undersurface of each of the projecting portions 246 of the case moving guide 245, and two protuberance-receiving grooves 248 (one shown), each of which is formed opposite to the corresponding protuberance 247 at the middle of the corresponding sliding slot 243 or 243'. The corresponding sliding slot 243 or 243' receives and locks the protuberances 247 when the case slider 241 is completely inserted into the main body frame 101.

Alternatively, the protuberances 247 can be formed to be elastically supported in the undersurfaces of the projecting portions 246 by elastic springs, and the like, to smoothly slide with the sliding slots 243 and 243' and thereby to easily move the case slider 241.

Further, the first moving unit 240 can further comprise a handle recess 249 for griping the case slider 241 formed at the rear of an undersurface of the case slider 241 to easily eject and insert the case slider 241 from and into the main body frame 101.

The second moving unit 229 is provided with first and second locking and releasing parts 230 and 230' to lock the first and second cases 210 and 220 to each other so as to allow the second document guide surface 221 of the second case 220 to form the portion of the document supply path B of the scanner unit 150 in cooperation with the first document guide surface 212 of the first case 210, or release the first and the second case 210 and 220 from each other so as to allow the second case 220 to be separated apart from the first case 210. The second moving unit 229 is further provided with a hinge part 255 to rotatably support a lower part of the second case 220 under the lower part of the first case 210 so as to allow the second case 220 to be rotated and thereby be separated apart from the first case 210.

The first and the second locking and releasing part 230 and 230' are installed respectively at both sides of upper parts of the first and the second case 210 and 220.

Figure 5:
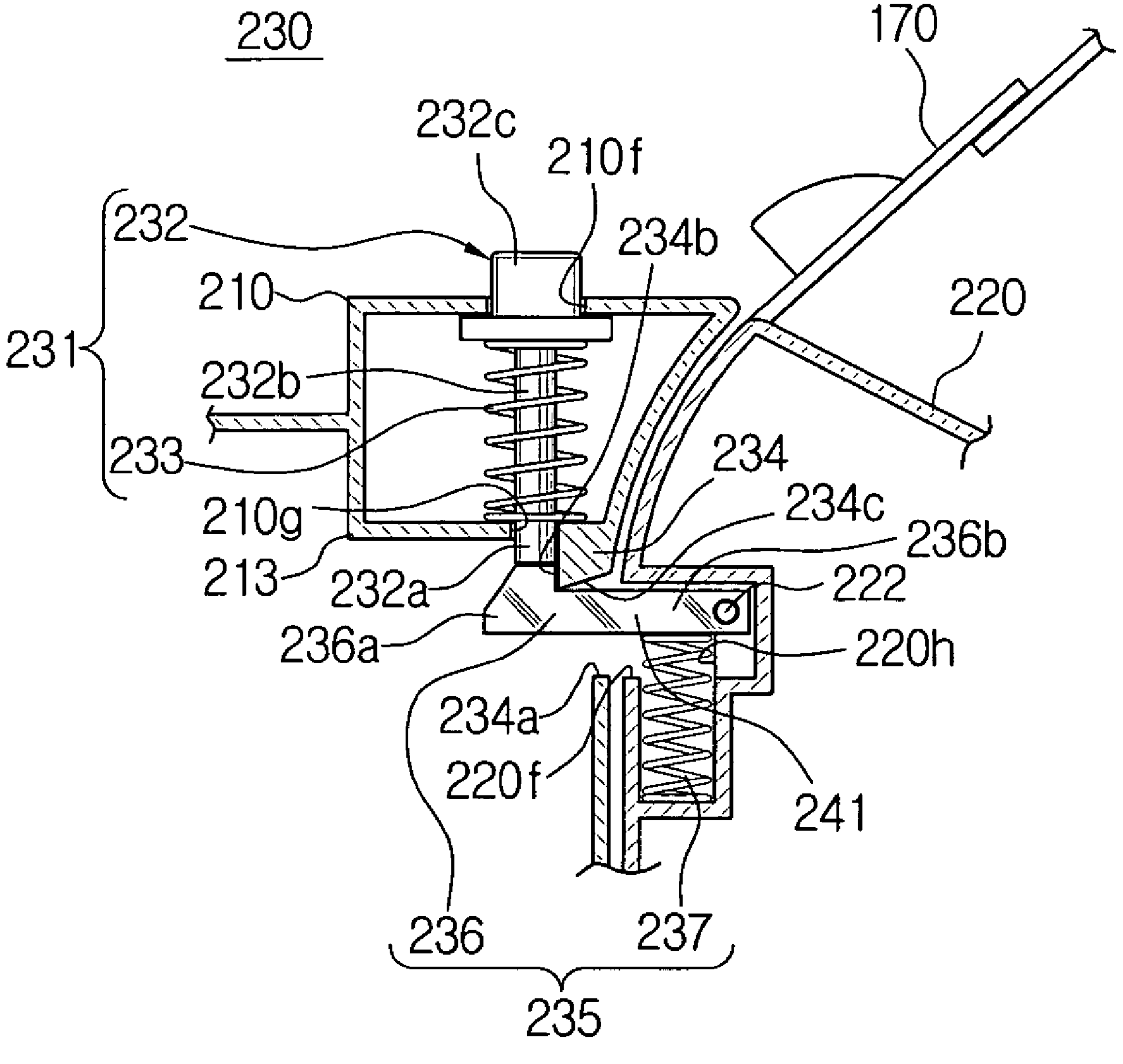
FIG. 5 is a cross sectional view of a locking and releasing part of a second moving unit of the jam removing apparatus of the multi-function machine shown in FIG. 2.

As shown in FIG. 5, each of the first and the second locking and releasing part 230 and 230' comprises a projected member 235 formed at the upper part of the second case 220, a receiving member 234 formed at a position corresponding to the projected member 235 at the upper part of the first case 210 to receive and lock the projected member 235, and a releasing member 231 to release a locking of the projected member 235 in the receiving member 234.

The projected member 235 is composed of a hook 236 having a hook-shaped free end 236*a* projected through a projected member hole 220*f*, and a fixed end 236*b* rotatably supported on a rotary axis 222 installed in a supporting recess 220*h* formed at the upper part of the second case 220. The projected member 235 further comprises a first elastic spring 237 installed in the supporting recess 220*h* to elastically press the hook 236 in a direction of engaging with the receiving member 234.

The receiving member 234 is composed of a hook-receiving opening 234*a* having a hook hanging jaw 234*b* formed opposite to the hook 236 of the projected member 235 at the one side of the upper part of the first case 210. The hook-receiving opening 234*a* has an inclined surface 234*c* to easily receive the hook-shaped free end 236*a* of the hook 236.

The releasing member 231 is provided with a button 232 to push the free end 236*a* of the hook 236 to be released from the hook-hanging jaw 234*b* of the hook-receiving opening 234*a*. The releasing member 231 is further provided with a restoring part 233 to restore the button 232 in an original position after the free end 236*a* of the hook 236 is released from the hook-hanging jaw 234*a* by the button 232.

The button 232 is formed of an elongated rod having one end 232*a* to come in contact with the free end 236*a* of the hook 236 through a first hole 210*g* formed at an inner reinforcing wall 213 of the first case 210, the other end 232*c* protruded outside through a second hole 210*f* formed at an upper surface of the first case 210, and an intermediate portion 232*b* with a ring-shaped lip to secure the button 232 thereby to restrain from being pulled out through the second hole 210*f*.

The restoring part 233 is formed of a second elastic spring disposed between the ring-shaped lip of the intermediate portion 232*b* and the inner reinforcing wall 213 to elastically press the other end 232*c* to protrude outside the first case 210.

The hinge part 255 of the second moving unit 229 is provided with a hinge axis 256 (shown in FIG. 6A) to rotatably fix the lower end of the second case 220 on the case slider 241 of the first moving unit 240, and a stopper 258 formed at the case slider 241 of the first moving unit 240 to restrict an angle that the second case 220 is rotated on the hinge axis 256 (i.e., a range that the second case 220 is separated apart from the first case 210).

In the present discussion, the hinge axis 256 is explained as fixed on the case slider 241, but it can also be fixed at the lower part of the first case 210.

The stopper 258 is formed of an inclined surface having a slope at or about 30° to a lower surface 220*i* of the second case 220, so that the second case 220 can rotate at an angle at or about 30° from the first case 210.

Figure 6A:
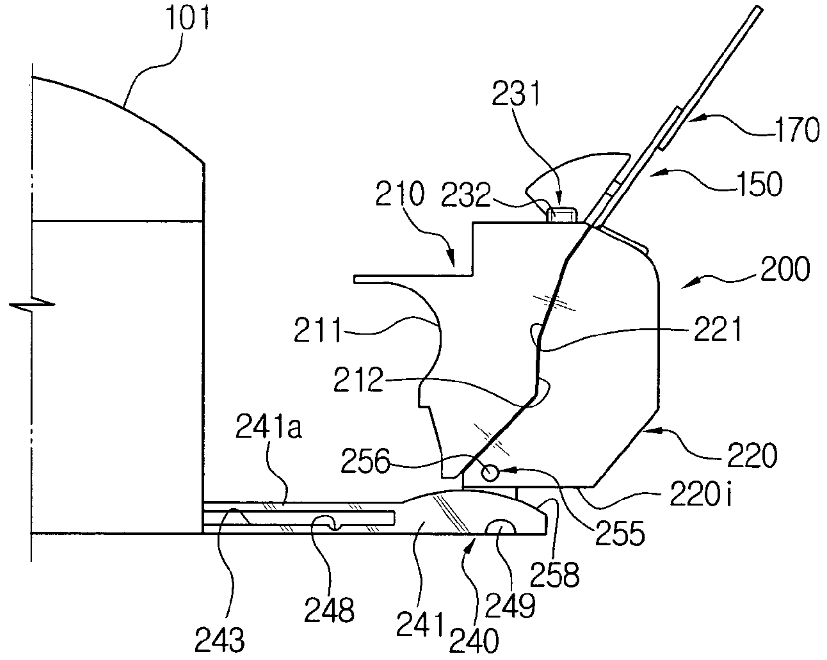
FIGS. 6A and 6B are side elevation views illustrating operation of the jam removing apparatus of the multi-function machine shown in FIG. 2.
Figure 6B:
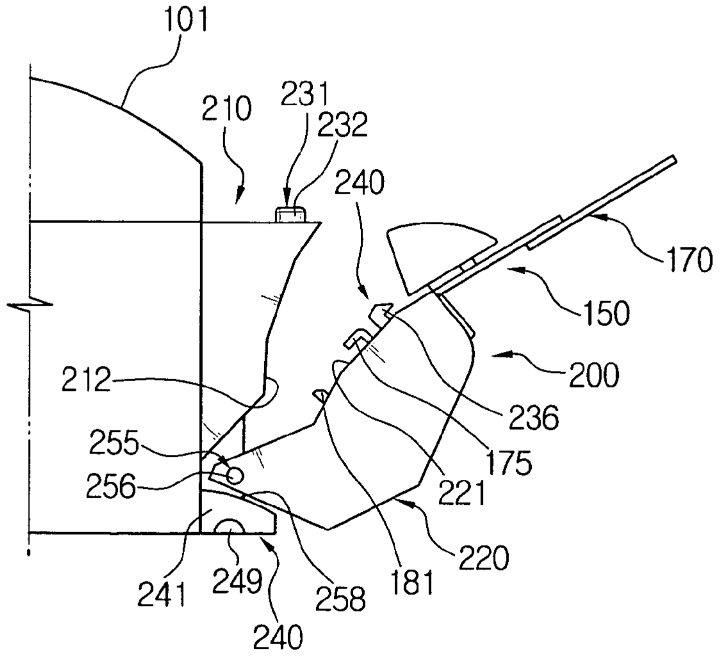

Accordingly, in the case of joining or coupling the second case 220 with the first case 210, when the second case 220 rotates in a counterclockwise direction on the hinge axis 256 of the hinge part 255 and moves from a separation position shown in FIG. 6B to a coupling position shown in FIG. 3, the second case 220 is coupled with the first case 210 as the free end 236*a* of the hook 236 is locked in the hook hanging jaw 234*b* of the hook-receiving opening 234*a*.

Alternatively, in the event of separating the second case 220 apart from the first case 210, when the other end 232*c* of the button 232 projected outside through the second hole 210*f* is pressed down to release the locking of the free end 236*a* of the hook 236 in the hook hanging jaw 234*b* of the hook-receiving opening 234*a*, the second case 220 rotates at an angle at or about 30° from the coupling position shown in FIG. 3 to the separation position shown in FIG. 6B. This rotation occurs with the releasing of the locking of the free end 236*a* of the hook 236 in the hook hanging jaw 234*b* of the hook-receiving opening 234*a*, and is then stopped by the stopper 258.

As described above, the multi-function machine 100 having the jam removing apparatus 200 of the present invention can not only remove a jammed sheet of paper P and document D en bloc in the same place by one jam removing apparatus when the sheet of paper P and/or document D are jammed during scanning and/or printing operations, but it also has the effect of reducing in size the multi-function machine 100. The size is reduced by disposing the paper supply cassette 128 below the printing means in the main body frame 101 and positioning the scanner unit 150 at the rear of the printer unit 110.

In an embodiment of the present invention of the multi-function machine 100 as described above, the printer unit 110 is explained and illustrated as composed of an inkjet printer using the ink cartridge 114 with the print head 114*a*. As one skilled in the art can understand and appreciate, the several embodiments of the present invention are not limited to this particular example, and the multi-function machine 100 can be comprised of an electrophotographic printer such as a laser printer using a developing device and a photosensitive drum, instead of the inkjet printer.

Further, to drive the rollers 132, 134, 135, 137; 176, 178, 182, 186 of the printer and the scanner units 110 and 150, the multi-function machine 100 of the present invention is explained and illustrated as using the printer power switching unit and the scanner power switching unit to switch the driving forces of the printer driving motor and the scanner driving motor according to the revolving direction thereof. As one skilled in the art can understand and appreciate, the several embodiments of the present invention are not limited to this particular example, and the multi-function machine 100 can be constructed to use one-way power transmitting devices such as spring clutches installed on the respective rollers to switch driving forces therefor, instead of the printer power switching unit and the scanner power switching unit.

Operation of the multi-function machine 100 having the jam removing apparatus described in accordance with an embodiment of the present invention as constructed above will now be described in great detail with reference to FIGS. 2 through 6B.

With reception of a printing command from a personal computer or the like, a controller (not shown) drives the printer driving motor to rotate in one direction, for example a clockwise direction.

As a result, the printer power switching unit connected with the printer driving motor transmits a driving force of the printer driving motor to a paper pickup gear train (not shown) to rotate the paper pickup roller 132 in the direction of picking up a sheet of paper P.

The printer power switching unit then transmits the driving force of the printer driving motor to a paper feed gear train (not shown) to drive the paper feed roller 134. The driving force is not transmitted, however, to a register gear train (not shown) and a paper discharge gear train (not shown) so as to not drive the register roller 135 and the paper discharge roller 137.

The paper pickup roller 132 picks up sheets of paper P stacked in the paper supply cassette 128 sheet by sheet in cooperation with a friction buckler (not shown) installed at the paper supply cassette 128, and conveys picked-up sheet of paper P toward the paper feed roller 134.

When a leading end of the picked-up sheet of paper P operates a paper sensor (not shown) installed between the paper feed roller 134 and the register roller 135, the controller begins to count the time that elapsed from the point in time when the paper sensor began operation. When a predetermined period of time (i.e., a period of time that the leading end of the picked-up sheet of paper P is aligned with and generates a curl at the nip between the register roller 135 and the register backup roller 136) lapses from the point of time the paper sensor has operated, the controller drives the printer driving motor to rotate in the other direction (i.e., a counterclockwise direction).

With a rotation of the printer driving motor in the counterclockwise direction, the printer power switching unit is separated apart from the paper pickup gear train and the paper feed gear train so as to not transmit the driving force of the printer driving motor thereto and thereby to stop a driving of the paper pickup roller 132 and the paper feed roller 134. At the same time, the driving force of the printer driving motor is transmitted to the register gear train and the paper discharge gear train to rotate the register roller 135 and the paper discharge roller 137 in a direction of feeding and discharging the sheet of paper P. As a result, the register roller 135 conveys the sheet of paper P under the print head 1114*a*.

With a conveying of the sheet of paper P to the print head 114*a*, the print head 114*a* jets ink onto the sheet of paper P to form image thereon, moving in the right and left directions by the carriage 192. The carriage 192 is reciprocated along the carriage shaft 116 by a power transporting belt (not shown) connected with a carriage driving motor (not shown).

The sheet of paper P on which image is formed is discharged onto the paper stacker 194 by the paper discharge roller 137 and the paper discharge backup roller 138, and is pulled out externally through the first opening 101*a*.

While the printer unit 110 performs the printing operation as described above, if the sheet of paper P is jammed therein, the jammed paper P is removed as follows.

First, a user grips the handle recess 249 formed at the rear of the undersurface of the case slider 241 and then pulls the case slider 241 backward and the protuberances 247 of the case slider locking part 247, 248 are released from the protuberance-receiving grooves 248. At the same time, the sliding slots 243 and 243' slide and move on the projecting portions 246, so that the case slider 241 is ejected backward, as shown in FIG. 4.

When the case slider 241 is ejected backward at or about 90 mm as described above, the sliding slots 243 and 243' collide with the projecting portions 246 and stop sliding. The case slider 241 thereby cannot move any further. The paper supply path A of the printer unit 110 positioned in the proximity of the paper guide surface 211 is exposed to the outside, as shown in FIG. 6A, since the first case 210 having the case slider 241 fixed thereunder is separated apart from the printer unit 110 together with the case slider 241.

Following exposure of the paper supply path A, the user removes the sheet of paper P jammed in the printer unit 110, and pushes the second case 220 or the case slider 241 frontward to move the first and the second case 210 and 220 to the first or original position.

As a result, the case slider 241 is inserted into the main body frame 101 through the third opening 101*c* with a sliding of the sliding slots 243 and 243' on the projecting portions 246.

After completion of the inserting of the case slider 241 into the main body frame 101, the protuberances 247 of the case slider locking part 247, 248 are inserted into the protuberance-receiving grooves 248 and are locked therein, so that the case slider 241 cannot move, but is fixed.

Further, as shown in FIG. 3, the first case 210 having the case slider 241 fixed thereunder is coupled with the printer unit 110, so that the paper guide surface 211 forms a portion of the paper supply path A together with the printer unit 110.

The processes for copying and transmitting simultaneously will now be explained in greater detail.

Firstly, when documents D are loaded into the document supply rest 170, the documents D slide down by their own weight and operate the document sensor 175 to turn on. As a result, the controller drives the scanner driving motor to rotate in one direction.

With a rotation of the scanner driving motor in the one direction, the scanner power switching unit transmits a driving force of the scanner driving motor to the document pickup roller gear through the document pickup gear train to rotate the document pickup roller 176.

The document pickup roller 176 then picks up the documents D one by one by a friction force of the document friction pad 177 coming in contact therewith in a predetermined pressure, and conveys the picked-up documents D to a document access sensor 181 through the document feed roller 178 and the document feed backup roller 180 that are idle.

A signal is generated after a leading end of the picked-up document D has operated the document access sensor 181. When the user pushes the copying or transmitting button (not shown), the controller drives the scanner driving motor to rotate in the other direction, and the scanner power switching unit thereby transmits the driving force of the scanner driving motor to the document feed roller gear, the white roller gear and the document discharge roller gear. the driving force is transmitted through the document feed gear train, the white roller gear train, and the document discharge gear train to rotate the document feed roller 178, the white roller 182 and the document discharge roller 186.

As a result, the document D is conveyed to a nip between the white roller 182 and the contact image sensor 184 by the document feed roller 178.

When the document D passes between the white roller 182 and the contact image sensor 184. The contact image sensor 184 reads data out of the document D.

More specifically, the contact image sensor 184 emits light onto the document D conveyed by the white roller 182 through a light emitting element (not shown) therein and detects light reflected from the document D through a photo sensor (not shown) therein. The contact image sensor 184 outputs a detected light signal to an image processing circuit (not shown).

The image processing circuit compares the data output from the contact image sensor 184 with reference data, performs shading correction, encodes and compresses the corrected data, and then transmits the encoded and compressed data to a facsimile unit (not shown) or the printer unit 110 for transmitting or printing. The reference data is data obtained by the contact image sensor 184 before scanning the document D. Before scanning the document D the contact image sensor 184 emits light onto the white roller 182 through the light emitting element, and then detects the light reflected from the white roller 182 through the photo sensor.

With completion of reading the data out of the document D as described above, the document D is discharged onto the document stacker 190 in the main body frame 101 by the document discharge roller 186 and the document discharge backup roller 187, and is pulled out externally through the second opening 101*b*.

If the document D is jammed during the scanning operation as described above, the jammed document D is removed as follows.

Firstly, the user presses down the other end 232*c* of the button 232 projected externally through the second hole 210*f*.

The free end 236*a* of the hook 236 is then pressed below the hook hanging jaw 234*b* by the one end 232*a* of the button 232, and is pulled out of the hook hanging jaw 234*b*.

When the free end 236*a* is pulled out of the hook hanging jaw 234*b*, the second case 220 rotates in the clockwise direction on the hinge axis 256 by its own weight, and moves from the coupling position shown in FIG. 3 to the separation position shown in FIG. 6B.

When the second case 220 rotates through an angle of or about 30°, the undersurface 220*i* of the second case 220 comes in contact with the stopper 258, and the second case 220 then stops rotating.

When the second case 220 is separated apart from the first case 210 as described above, the first and the second document guide surfaces 211 and 221 of the first and the second cases 210 and 220 constituting the document supply path B are exposed to the outside, so that the jammed document D can be easily be removed.

After the jammed document D is completely removed, the second case 220 is rotated in the counterclockwise direction on the hinge axis 256 of the hinge part 255 by user to move the second case 220 in the first position. The second case 220 is then moved from the separation position shown in FIG. 6B to the coupling position shown in FIG. 3.

After rotating the second case 220 in the counterclockwise direction on the hinge axis 256, the free end 236*a* of the hook 236 is stuck into the hook hanging jaw 234*b*, sliding along the inclined surface 234*c* of the hook-receiving opening 234*a*.

When the free end 236*a* of the hook 236 is completely locked in the hook hanging jaw 234*b*, the elastic spring 237 secures the free end 236*a* not to slip out of the hook hanging jaw 234*b*.

As a result, the first and the second cases 210 and 220 are maintained in the coupling state shown in FIG. 3.

As apparent from the foregoing description, it can be appreciated that the multi-function machine having the jam removing apparatus (and to which the jam removing method discussed above can be applied) according to an embodiment of the present invention can remove a jammed sheet of paper P and document D en bloc in the same place by one jam removing apparatus, when the sheet of paper P and/or the document D are jammed in the scanning and/or the printing operations.

Further, the multi-function machine using both the jam removing apparatus and jam removing method thereof according to an embodiment of the present invention can have a reduced size and a compact structure, by disposing of the paper supply cassette of the printer unit for printing the sheet of paper below the print head in the main body frame and positioning the scanner unit for scanning the document at the rear of the printer unit.

As above, a specific preferred embodiment of the present invention has been illustrated and described. However, it will be understood by those skilled in the art that the present invention should not be limited to the described preferred embodiment, but various changes and modifications can be made within the spirit and scope of the present invention as defined by the appended claims.

What is claimed is:

1. A multi-function machine having a printer unit to print data onto a sheet of paper, a scanner unit to read data from a document, and a jam removing apparatus, the jam removing apparatus comprising:

a first case disposed with respect to the printer unit to form a portion of a paper supply path of the printer unit and having a portion of component parts of the scanner unit therein;

a second case disposed with respect to the first case to form a portion of a document supply path of the scanner unit together with the first case and having a remaining portion of the component parts of the scanner unit therein; and a first moving unit to separate the first and second cases apart from the printer unit so as to remove a jammed of sheet of paper when the sheet of paper is jammed in the printer unit;

wherein the first case comprises a paper guide surface guiding the sheet of paper from a paper pickup roller to a paper feed roller to form the portion of the paper supply path, and a first document guide surface guiding the document conveyed by the scanner unit; and the second case comprises a second document guide surface guiding the document from a document pickup roller to a document discharge roller to form the portion of the document supply path in cooperation with the first document guide surface.

2. The multi-function machine as claimed in claim 1, wherein the first moving unit comprises:

a case moving guide installed at a main body frame; and a case slider installed at the first case to slide along the case moving guide.

3. The multi-function machine as claimed in claim 2, wherein the case moving guide comprises:

at least one projecting portion installed at the main body frame; and the case slider comprises a sliding plate having at least one sliding slot formed corresponding to the projecting portion to slidably receive the projecting portion.

4. The multi-function machine as claimed in claim 3, wherein the projecting portion comprises:

one of a |-shaped projection and a small roller.

5. The multi-function machine as claimed in claim 3, wherein the first moving unit further comprises:

a case slider locking part to lock the case slider after the case slider is completely inserted into the main body frame along the case moving guide.

6. The multi-function machine as claimed in claim 5, wherein the case slider locking part comprises:

a protuberance formed at the projecting portion; and a protuberance-receiving groove formed at the sliding slot.

7. A multi-function machine having a printer unit to print data onto a sheet of paper, a scanner unit to read data from a document, and a jam removing apparatus, the jam removing apparatus comprising:

a first case disposed with respect to the printer unit to form a portion of a paper supply path of the printer unit and having a portion of component parts of the scanner unit therein;

a second case disposed with respect to the first case to form a portion of a document supply path of the scanner unit together with the first case and having a remaining portion of the component parts of the scanner unit therein;

a first moving unit to separate the first and second cases apart from the printer unit so as to remove a jammed of sheet of paper when the sheet of paper is jammed in the printer unit; and a second moving unit to separate the second case apart from the first case so as to remove a jam of document when the document is jammed in the scanner unit.

8. The multi-function machine as claimed in claim 7, wherein the second moving unit comprises:

a locking and releasing part to lock or release the first and the second cases on or from each other; and a hinge part to rotatably support the second case on one of the first case and a case slider of the first moving unit.

9. The multi-function machine as claimed in claim 8, wherein the locking and releasing part comprises:

at least one projected member formed at one of the first and the second cases;

at least one receiving member formed at a position corresponding to the projected member at the other of the first and the second cases to receive and lock the projected member; and at least one releasing member to release a locking between the projected member and the receiving member.

10. The multi-function machine as claimed in claim 9, wherein:

the projected member comprises a hook supported elastically and rotatably at the one of the first and the second cases;

the receiving member comprises a hook-receiving opening having a hook-hanging jaw formed corresponding to the hook at the other of the first and the second cases; and the releasing member comprises a button to push the hook to be released from the hook-hanging jaw of the hook-receiving opening, and a restoring part to restore the button in an original position when the button is released from the hook-hanging jaw.

11. The multi-function machine as claimed in claim 10, wherein the button comprises:

a rod having one end to come in contact with the hook through a first hole formed at an inner reinforcing wall of the first case, the other end protruded outside through a second hole formed at an outer surface of the first case, and an intermediate portion with a ring-shaped lip to secure the button thereby to restrain from being pulled out through the second hole; and the restoring part comprises an elastic spring disposed between the ring-shaped lip and the inner reinforcing wall so as to elastically press the other end of the rod to protrude outside the first case.

12. The multi-function machine as claimed in claim 8, wherein the hinge part comprises:

a hinge axis to rotatably fix the second case on one of the first case and the case slider of the first moving unit installed at the first case; and a stopper formed at the case slider of the first moving unit to restrict a range that the second case is separated apart from the first case.

13. A method for removing a jammed sheet of paper or document in a multi-function machine having a printer unit to print data onto a sheet of paper, and a scanner unit to read data from a document, comprising:

separating a first case apart from the printer unit, the first case being disposed with respect to the printer unit to form a portion of paper supply path of the printer unit while a second case is locked with the first case, the second case forming a portion of the paper supply path of the scanner unit together with the first case; and removing the jammed of sheet of paper from the portion of paper supply path;

wherein the step of separating the first case apart from the printer unit comprises sliding a case slider installed at the first case along a case moving guide installed at a main body frame.

14. A method for removing a jammed sheet of paper or document in a multi-function machine as claimed in claim 13, further comprising:

separating the second case apart from the first case; and removing a jammed document from the portion of document supply path.

15. A method for removing a jammed sheet of paper or document in a multi-function machine as claimed in claim 14, wherein the step of separating the second case apart from the first case comprises:

releasing a locking between the first case and the second case; and rotating the second case about one of the first case and a case slider installed at the first case, within a predetermined range.

* * * * *

UNITED STATES PATENT AND TRADEMARK OFFICE

CERTIFICATE OF CORRECTION

PATENT NO. : 7,605,956 B2
APPLICATION NO. : 10/845083
DATED : October 20, 2009
INVENTOR(S) : Yong-hyun Lee It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 1559 days.

Signed and Sealed this

Fifth Day of October, 2010

David J. Kappos

David J. Kappos
*Director of the United States Patent and Trademark Office*